United States Patent
Chen et al.

(10) Patent No.: US 11,805,231 B2
(45) Date of Patent: Oct. 31, 2023

(54) TARGET TRACKING METHOD APPLIED TO VIDEO TRANSMISSION

(71) Applicant: Aver Information Inc., New Taipei (TW)

(72) Inventors: Chih-Kang Chen, New Taipei (TW); Ming-Te Wu, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 0 days.

(21) Appl. No.: 17/679,179

(22) Filed: Feb. 24, 2022

(65) Prior Publication Data

US 2022/0279146 A1    Sep. 1, 2022

(30) Foreign Application Priority Data

Feb. 26, 2021    (TW) .................................. 110106946

(51) Int. Cl.
*H04N 7/18* (2006.01)
*G10L 25/78* (2013.01)
*H04N 23/61* (2023.01)
*H04N 23/695* (2023.01)

(52) U.S. Cl.
CPC ............. *H04N 7/183* (2013.01); *G10L 25/78* (2013.01); *H04N 7/188* (2013.01); *H04N 23/61* (2023.01); *H04N 23/695* (2023.01)

(58) Field of Classification Search
CPC ........ H04N 7/183; H04N 7/188; H04N 7/147; H04N 23/61; H04N 23/695; G10L 25/78; G01S 3/8083
See application file for complete search history.

(56) References Cited

U.S. PATENT DOCUMENTS

| | | | | |
|---|---|---|---|---|
| 9,686,511 | B1* | 6/2017 | Chou | H04N 23/69 |
| 10,755,727 | B1* | 8/2020 | Chu | H04R 1/406 |
| 2011/0103191 | A1* | 5/2011 | Shin | G01S 3/8083 |
| | | | | 367/125 |
| 2011/0285807 | A1* | 11/2011 | Feng | G06V 40/161 |
| | | | | 704/E17.001 |
| 2015/0314454 | A1* | 11/2015 | Breazeal | G10L 15/32 |
| | | | | 700/259 |
| 2015/0326968 | A1* | 11/2015 | Shigenaga | G09G 5/391 |
| | | | | 381/92 |
| 2018/0253862 | A1* | 9/2018 | Barnes | G01C 19/5776 |

* cited by examiner

*Primary Examiner* — Amy R Hsu
(74) *Attorney, Agent, or Firm* — McClure, Qualey & Rodack, LLP

(57) ABSTRACT

The invention discloses a target tracking method applied to a video transmission, which can automatically track a specific target and capture images according to sound. The target tracking method includes the following steps: step one is to set a first target area; step two is to determine whether a corresponding sound source position points to the first target area according to a sound source position signal; step three is to capture an image of the first target area and output to a display unit by a camera unit when the sound source position points to the first target area; and step four is to execute a sound source tracking procedure when the sound source position is not pointing to the first target area.

9 Claims, 6 Drawing Sheets

TARGET TRACKING METHOD APPLIED TO VIDEO TRANSMISSION

CROSS REFERENCE TO RELATED APPLICATIONS

This Non-provisional application claims priority under 35 U.S.C. § 119(a) on Patent Application No. 110106946 filed in Republic of China on Feb. 26, 2021, the entire contents of which are hereby incorporated by reference.

BACKGROUND

1. Technical Field

The invention relates to a tracking method, in particular, to a target tracking method applied to a video transmission.

2. Description of Related Art

With the advancement of transmission technology, in the early days, only face-to-face meetings were gradually changed to teleconferences, so that mutual communication was not limited by distance. In addition, the transmission bandwidth and transmission rate have made great progress in recent years, which also makes the video conference more and more popular. Therefore, people in different spaces can receive clearer information through voice and video, and are less prone to poor communication or misunderstanding.

In the current video conference, participants in different spaces can transmit data such as local images and display screen of the computer to a third party through the network, so that the participants in the video conference can have the same information. Among them, the local image usually transmits the image of a specific angle or a specific area to the third party through the camera, and the display screen of the computer transmits the content of the digital data to be discussed to the third party.

In the above-mentioned conference situation, all parties conduct discussions on the basis of existing digital data, and generally do not encounter problems. More often, however, parties have immediate ideas that need to be communicated by handwriting or drawing (e.g., writing and drawing on the whiteboard or glass). At this time, the angle of the camera must be adjusted by the user so that the content of real-time writing or drawing can be transmitted to a third party.

As a result, the camera will need to be adjusted many times in the conference, thereby delaying the progress of the conference, and causing inconvenience and time waste for conference participants. Therefore, how to provide a target tracking method applied to a video transmission to overcome the aforementioned problems is one of the important subject matters.

SUMMARY OF THE INVENTION

In view of the foregoing, an object of the invention is to provide a target tracking method applied to a video transmission, which can actively track a specific target during a video conference.

To achieve the above, the invention provides a target tracking method applied to a video transmission, which includes the following steps. Step 1 is to set a first target area. Step 2 is to determine whether a corresponding sound source position points to the first target area according to a sound source position signal. Step 3 is to capture an image of the first target area and output to a display unit by a camera unit when the sound source position points to the first target area. Step 4 is to perform a sound source tracking procedure when the sound source position is not pointing to the first target area.

In one embodiment, the step of setting the first target area further includes selecting the first target area according to the image captured by the camera unit; and recording a position parameter of the camera unit corresponding to the first target area.

In one embodiment, wherein the first target area is selected by selecting in a display screen, by adjusting the camera unit to be aligned with the first target area, or by intelligently identifying the first target area.

In one embodiment, the position parameter is selected from the group associated with the left-right rotation angle, the up-down tilt angle, the magnification, and combinations thereof.

In one embodiment, the sound source tracking procedure contains the following sub-steps. Sub-step 1 is to generate a driving control signal according to the sound source position signal. Sub-step 2 is to adjust the camera unit to align with a second target area according to the driving control signal. Sub-step 3 is to perform object recognition on an image of the second target area and obtain a target object. Sub-step 4 is to adjust the camera unit to capture the image of the target object.

In one embodiment, after performing the sound source tracking procedure, the target tracking method further includes re-determining whether the sound source position signal corresponding to the sound source position is received.

In one embodiment, when the sound source position signal is not received, it further includes determining whether a sound signal is not received within a preset time period; performing an object recognition on an image captured by the camera unit and determining whether there is a target object in the image if the determination result is "YES"; and capturing the image of the first target area by the camera unit if the target object does not exist in the image.

In one embodiment, the target tracking method further includes re-determining whether the sound source position signal corresponding to the sound source position is received if the sound signal is received within the preset time period.

In one embodiment, the target tracking method further includes re-determining whether the sound source position signal corresponding to the sound source position is received if the target object exists in the image captured by the camera unit.

As mentioned above, the target tracking method applied to the video transmission of the invention utilizes the sound source position signal to determine whether the target range to be tracked is dynamic or not. Accordingly, the specific target can be actively tracked, and the corresponding image can be captured, thereby avoiding the situation that the user repeatedly adjusts the camera unit to affect the video transmission.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

The following disclosures, with reference to corresponding figures, provide detail descriptions for preferable embodiments of the pairing and interconnecting method for electronic devices in the present invention. Furthermore, reference will be made to the drawings to describe various inventive embodiments of the present disclosure in detail, wherein like numerals refer to like elements throughout.

Figure 1:
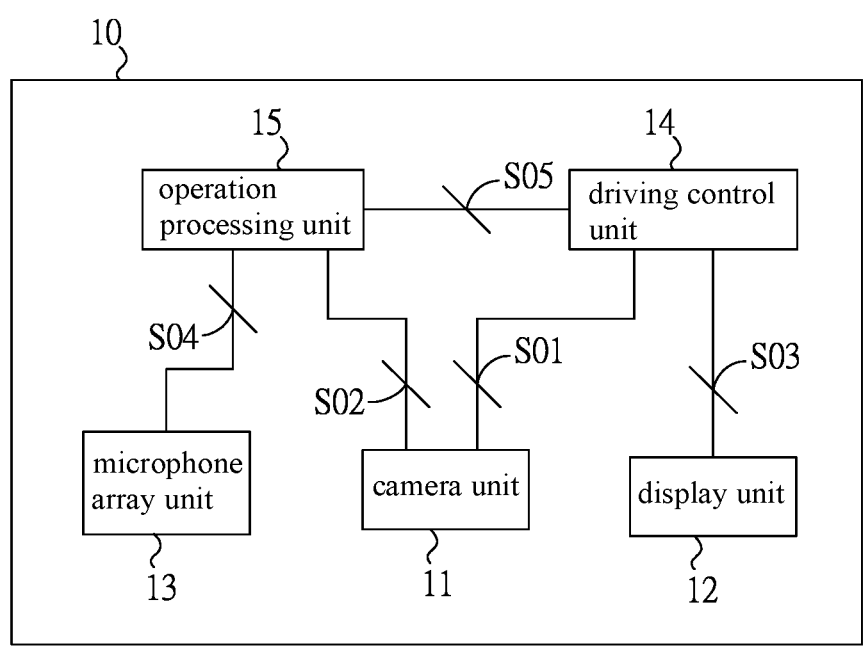
FIG. 1 is a block diagram showing a video system used in conjunction with a target tracking method applied to the video transmission according to an embodiment of the invention.

Please refer to FIG. 1, a target tracking method applied to a video transmission according to an embodiment of the invention, which is used in conjunction with a video system 10. The video system 10 at least includes a camera unit 11, a display unit 12, a microphone array unit 13, a driving control unit 14, and an operation processing unit 15. The video transmission can be applied to the video conference or the general Video-chat and other occasions. In the embodiment, the video conference is taken as an example for description.

The camera unit 11 is electrically connected to the driving control unit 14 and the operation processing unit 15, respectively, and the camera unit 11 operates through the driving control signal S01 output by the driving control unit 14. The driving control signal S01 may include but is not limited to controlling the left-right rotation angle, the up-down tilt angle, or the magnification of the camera unit 11, and in the embodiment, the left-right rotation angle, the up-down tilt angle, or the magnification can be controlled by different actuators or motors, respectively. The image S02 captured by the camera unit 11 is transmitted to the operation processing unit 15 for further utilization.

The display unit 12 is electrically connected to the driving control unit 14 and displays a displaying image according to the driving signal S03 output by the driving control unit 14. Among them, the displaying image may be the image S02 captured by the camera unit 11, the image existing in the storage unit (not shown in the figure), or other external input image.

The microphone array unit 13 is electrically connected to the operation processing unit 15 to transmit the sound signal S04 to the operation processing unit 15. In the sound signal S04 output by the microphone array unit 13, in addition to the sound information, it also includes angle or phase information. In short, the source direction of the sound can be obtained by analyzing the sound signal S04 of the microphone array unit 13.

The operation processing unit 15 is electrically connected to the driving control unit 14. The operation processing unit 15 outputs the control signal S05 to the driving control unit 14 to drive the camera unit 11 or the display unit 12 according to calculating or judging the received signal.

In addition, the image S02 captured by the camera unit 11 and the sound information of the sound signal S04 captured by the microphone array unit 13 can also be transmitted to the outside through a transmitting unit (not shown in the figure), so as to enable third parties to conduct the video conference with the local side. The transmitting unit may include, but is not limited to, the wired transmitting unit, the wireless transmitting unit, and combinations thereof.

In order to facilitate the subsequent description of the target tracking method applied to the video transmission of the embodiment of the invention, please refer to FIG. 2 and FIG. 3 below to briefly describe the scene configuration of the video conference of the embodiment.

Figure 2:
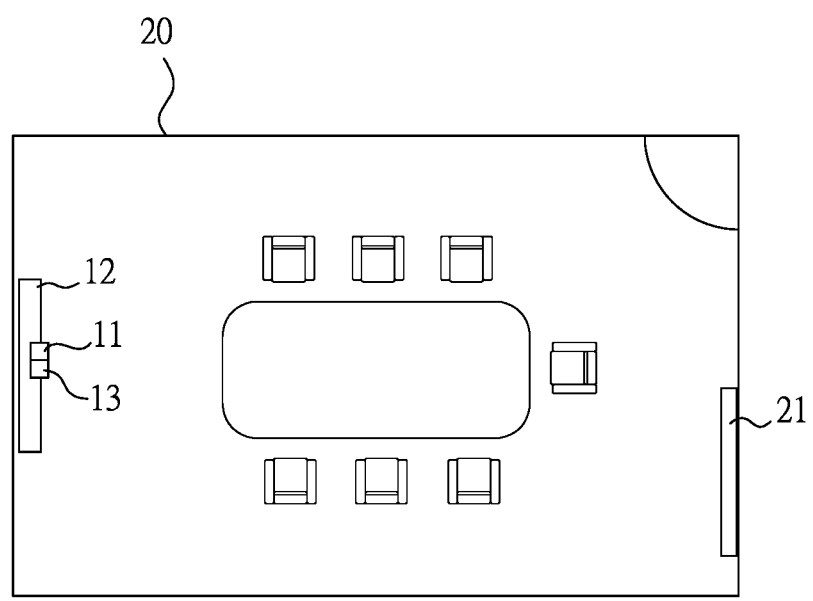
FIG. 2 is a schematic diagram showing the scene configuration of the target tracking method applied to the video transmission according to the embodiment of the invention.
Figure 3:
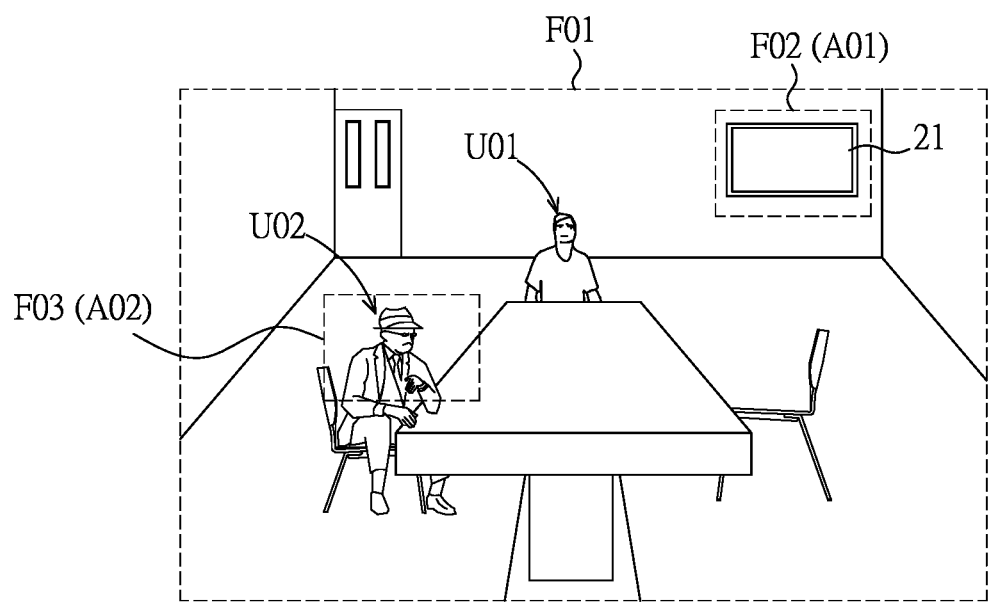
FIG. 3 is a schematic diagram showing an image captured by the camera unit of the target tracking method.

Please refer to FIG. 2, which is a schematic diagram of the scene configuration of the target tracking method applied to the video transmission according to the embodiment of the invention. The video system 10 is arranged in front of a conference room 20, the camera unit 11 and the microphone array unit 13 are arranged adjacent to each other, and a whiteboard 21 is provided behind the conference room 20 for the user to write.

Please refer to FIG. 3 again, which is a schematic diagram of the image S02 captured by the camera unit 11. The first frame F01 corresponds to the panoramic area of the conference room, the second frame F02 corresponds to the close-up area of the whiteboard 21, and the third frame F03 corresponds to the close-up area of the second user U02 participating in the video conference.

In the following, please refer to FIG. 1 to FIG. 4C to illustrate the target tracking method applied to the video transmission according to the embodiment of the invention. After the video system 10 is turned on, the target tracking method of the embodiment can be performed, which includes steps P01 to P09. First, after the video system 10 is turned on, the camera unit 11 transmits the captured image S02 to the display unit 12 for playback.

Step P01 is to set a first target area A01. In the embodiment, the first target area A01 refers to the area where the whiteboard 21 is located, and the participants participating in the video conference in the conference room 20 may write or draw on the whiteboard 21 in real time.

Further description, step P01 also includes sub-steps SP11 and SP12. The sub-step SP11 is to select the first target area A01 according to the image S02 captured by the camera unit 11. In the embodiment, the first target area A01 can be selected through the following three methods. The first method is to select from the display screen of the display unit 12, the second method is to select by adjusting the alignment of the camera unit 11 to aim at the first target area A01, and the third method is to select by intelligently identifying the first target area A01. The three methods will be briefly described below.

Regarding the first method, the camera unit 11 can capture the image S02 of the first frame F01 and display it on the display unit 12. The user can select the area of the second frame F02 through touch control, mouse, or remote control, and set it as the first target area A01.

Regarding the second method, the user can adjust the left-right rotation angle, the up-down tilt angle, and the magnification of the camera unit 11 to capture the image S02 of the second frame F02. The image S02 of the second frame F02 will be displayed on the display unit 12, and then the user will select the displaying image and set it as the first target area A01.

Regarding the third method, it is possible to issue a command to identify the whiteboard to the video system 10, to automatically select the area of the second frame F02 in the image S02 of the first frame F01 through intelligent identification, and to set it as the first target area A01.

Next, sub-step SP12 is to record a position parameter of the camera unit 11 corresponding to the first target area A01. Since the camera unit 11 correspondingly captures the image S02 of the first target area A01 by controlling the left-right rotation angle, the up-down tilt angle, and the magnification, the position parameters (including the left-right rotation angle, the up-down tilt angle, and the magnification) are recorded in the video system 10, so that the camera unit 11 can be quickly adjusted by the driving control unit 14 to correspondingly move to the location of the first target area A01 according to the position parameter when necessary.

Step P02 is to perform the first target area tracking mode. After the above setting, when the video system 10 starts to perform the video transmission, the first target area tracking mode can be started.

Step P03 is to determine whether the sound source position signal is received. The microphone array unit 13 receives the sound in the conference room 20, converts it into the sound signal S04, and transmits it to the operation processing unit 15. Since the microphone array unit 13 uses an array of microphones for sound collection, after analyzing the sound signal S04, the direction of the sound source can be obtained. In the embodiment, the sound source position signal can be obtained through a time difference of arrival (TDOA) algorithm or a circular integrated cross spectrum (CICS) algorithm. In step P03, step P04 is performed if the determination result is "Yes", and step P07 is performed if the determination result is "No".

Step P04 is to determine whether the corresponding sound source position points to the first target area A01 according to the sound source position signal. Since the position of the first target area A01 in the conference room 20 has been set in the previous step P01, it can be known whether the corresponding sound source position points to the direction of the first target area A01 by analyzing the sound source position signal. Hereinafter, step P05 is performed if the determination result is "Yes" and step P06 is performed if the determination result is "No".

It is should be noted that the sound source position signal will point to the direction or location of the first target area A01 when a first user U01 in the conference room 20 writes or draws on the whiteboard 21, or speaks at the position close to the whiteboard 21.

When the determination result of step P04 is "Yes", that is, when the sound source position points to the first target area A01, then step P05 is performed that the image S02 of the first target area A01 is captured by the camera unit 11 and output to the display unit 12 accordingly. Here, the operation processing unit 15 outputs the corresponding control signal S05 to the driving control unit 14 according to the previously recorded position parameter of the first target area A01 corresponding to the camera unit 11. Then, the driving control unit 14 outputs the corresponding driving control signal S01 to drive the camera unit 11 to turn and adjust the focus to align with the first target area A01.

In addition, since the video conference must be attended by a third party at the remote end, the image S02 of the first target area A01 can also be transmitted to the third party through the transmitting unit at the same time.

Figure 4A:
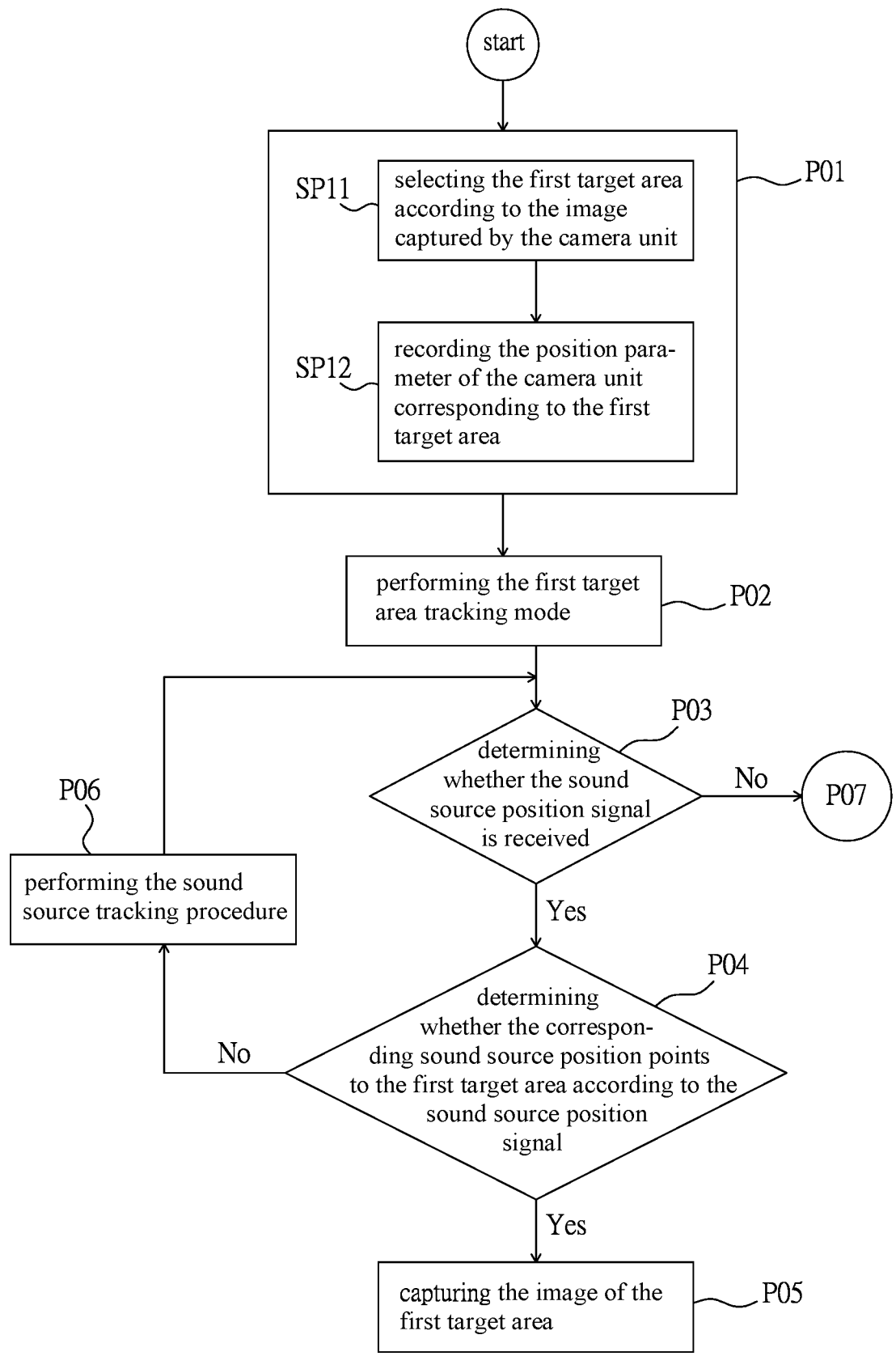
FIG. 4A is a partial flow chart showing the target tracking method applied to the video transmission according to an embodiment of the invention.
Figure 4B:
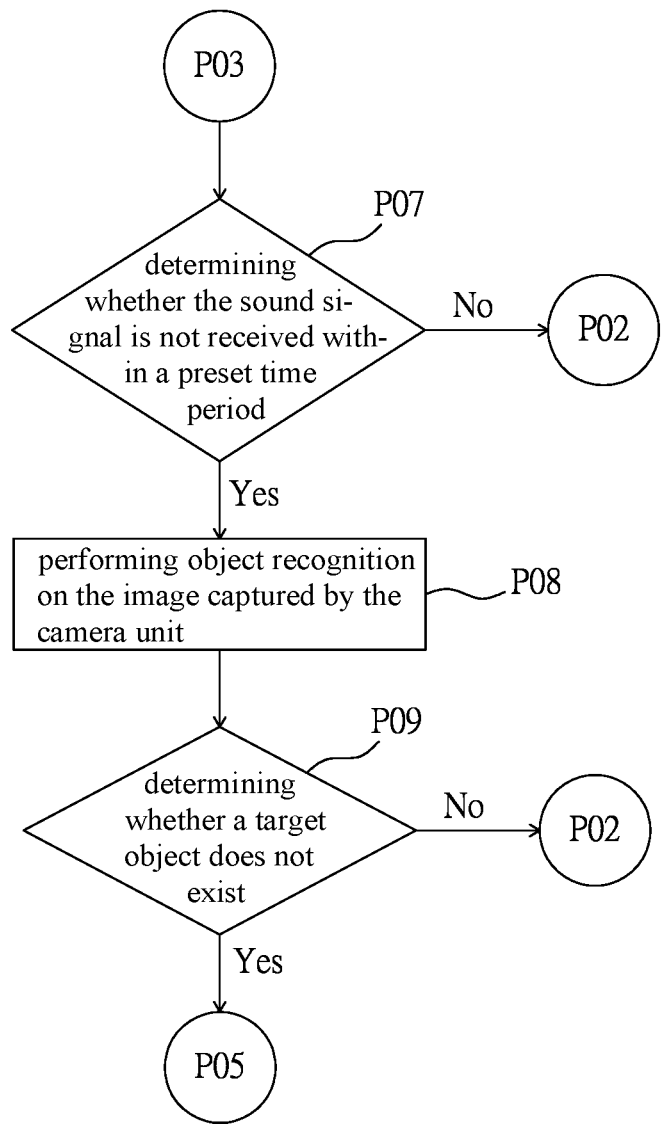
FIG. 4B is another partial flowchart showing the target tracking method applied to the video transmission according to the embodiment of the invention.
Figure 4C:
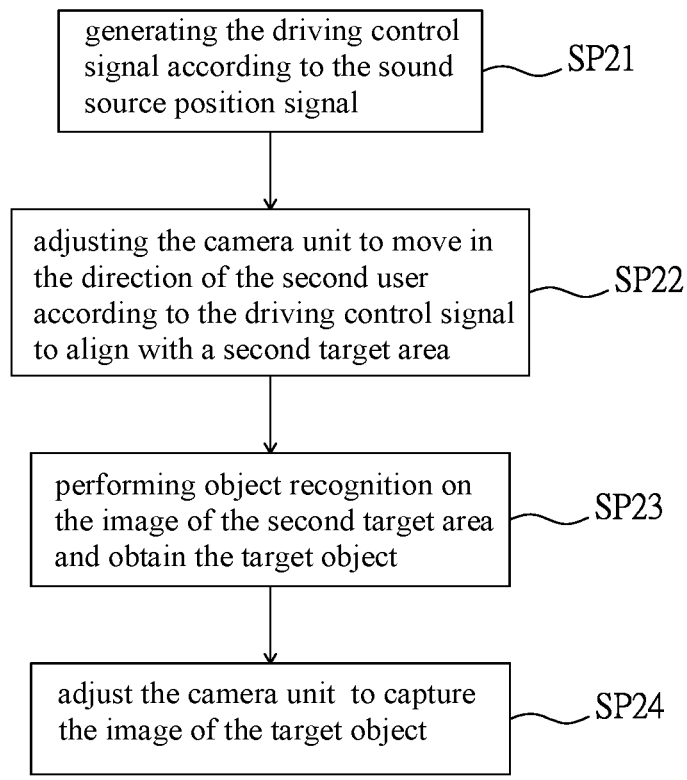
FIG. 4C is a flow chart showing the execution of the sound source tracking procedure in the target tracking method applied to the video transmission according to the embodiment of the invention.

When the determination result of step P04 is "No", that is, when the sound source position does not point to the first target area A01, then step P06 is performed which is to perform the sound source tracking procedure. Further description, the sound source tracking procedure of step P06 further includes sub-steps SP21 to SP24 (as shown in FIG. 4C).

Sub-step SP21 is to generate the driving control signal S01 according to the sound source position signal. Here, for example, the second user U02 in the conference room 20 is speaking, so the sound source position signal analyzed by the sound signal S04 of the microphone array unit 13 will cause the driving control unit 14 to generate the driving control signal S01.

Sub-step SP22 is to adjust the camera unit 11 to move in the direction of the second user U02 according to the driving control signal S01 to align with a second target area A02 and capture the corresponding image S02. It should be noted that in sub-step SP22, only the left-right rotation angle, the up-down tilt angle and their combinations of the camera unit 11 can be adjusted to obtain a rough image S02 of the second target area A02.

Sub-step SP23 is to perform object recognition on the image S02 of the second target area A02 and obtain a target object. Here, the object to be recognized is a speaking person, so the video system 10 performs person feature recognition on the image S02, and then obtains the position and range of the target object in the image S02.

Sub-step SP24 is to adjust the camera unit 11 to capture the image S02 of the target object. Here, the magnification of the camera unit 11 can be further adjusted to obtain a close-up of the second user U02, wherein, the second target area A02 is the third frame F03 corresponding to the close-up area of the second user U02. It is to be noted that, if necessary, in sub-step SP24, the left-right rotation angle or the up-down tilt angle of the camera unit 11 can be adjusted at the same time to obtain a more accurate image S02.

Step P07 is performed if the determination result in step P03 is "No", which means that the sound source position signal is not received. Step P07 is to determine whether the sound signal S04 is not received within a preset time period, which may be preset by the system or set by the user, and the time period is, for example, but not limited to, 1 to 5 seconds. Hereinafter, step P08 is performed if the determination result is "Yes" and step P02 is performed to continue to perform the first target area tracking mode if the determination result is "No".

Step P08 is to perform object recognition on the image S02 captured by the camera unit 11. Here, the object to be recognized is the person in the image S02, so the video system 10 performs person feature recognition for the image S02.

Step P09 is to determine whether a target object does not exist. Here, the definition of the target object is any user, but in other embodiments, the target object can also be a self-defined cat, dog, or bird, which is not limited herein. When it is determined that the target object does not exist in the image S02, step P05 is performed, and the camera unit 11 captures the image S02 of the first target area A01. When the determination result is that the target object exists in the image S02, step P02 is performed to continue to perform the first target area tracking mode.

In summary, the target tracking method applied to the video transmission of the invention can select the target area to be tracked through various and flexible setting methods and preset various settings of the camera unit corresponding to the target area. In addition, during the video transmission, the sound signal captured by the microphone array unit is used to analyze the sound source position to determine whether there is dynamic happening in the target area, so that it can actively track the specific target and capture the corresponding image. Accordingly, during the video transmission, especially the real-time video conference, the user can concentrate on the conference without repeatedly adjusting the camera unit.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A target tracking method applied to a video transmission, comprising:
    setting a first target area, which comprises selecting the first target area according to the image captured by the camera unit and recording a position parameter of the camera unit corresponding to the first target area;
    capturing a sound signal by a microphone array unit thereby obtaining a sound source position signal;
    determining whether a corresponding sound source position of a target object points to the first target area according to the sound source position signal;
    capturing an image of the first target area and output to a display unit by a camera unit when the sound source position of the target object points to the first target area; and
    performing a sound source tracking procedure when the sound source position of the target object is not pointing to the first target area,
    wherein the sound source tracking procedure comprises capturing an image of a second target area, which corresponds to the sound source position of the target object and thereby outputting to the display unit,
    wherein the image of the second target area being comprising the target object.

2. The target tracking method applied to the video transmission of claim 1, wherein the first target area comprising an instant writing area or an instant drawing area.

3. The target tracking method applied to the video transmission of claim 1, wherein the first target area is selected by selecting in a display screen, by adjusting the camera unit to be aligned with the first target area, or by intelligently identifying the first target area.

4. The target tracking method applied to the video transmission of claim 1, wherein the position parameter is selected from the group associated with the left-right rotation angle, the up-down tilt angle, the magnification, and combinations thereof.

5. The target tracking method applied to the video transmission of claim 1, wherein the sound source tracking procedure, further comprising:
    generating a driving control signal according to the sound source position signal;
    adjusting the camera unit to align with the second target area according to the driving control signal, wherein the second target area being different from the first target area;
    performing object recognition on an image of the second target area and obtain the target object; and
    adjusting the camera unit to capture the image of the target object.

6. The target tracking method applied to the video transmission of claim 1, wherein after performing the sound source tracking procedure, the target tracking method further comprises re-determining whether the sound source position signal corresponding to the sound source position is received.

7. The target tracking method applied to the video transmission of claim 6, wherein when the sound source position signal is not received, further comprising:
    determining whether a sound signal is not received within a preset time period;
    performing an object recognition on an image captured by the camera unit and determining whether there is the target object in the image if the determination result is "YES"; and
    capturing the image of the first target area by the camera unit if the target object does not exist in the image and capturing the image of the second target area if the target object existing in the image.

8. The target tracking method applied to the video transmission of claim 7, further comprises re-determining whether the sound source position signal corresponding to the sound source position is received if the sound signal is received within the preset time period.

9. The target tracking method applied to the video transmission of claim 7, further comprises re-determining whether the sound source position signal corresponding to the sound source position is received if the target object exists in the image captured by the camera unit.

* * * * *